US008861535B2

(12) United States Patent
Koodli et al.

(10) Patent No.: US 8,861,535 B2
(45) Date of Patent: Oct. 14, 2014

(54) MULTI-TIERED PAGING SUPPORT USING PAGING PRIORITY

(75) Inventors: Rajeev Koodli, Sunnyvale, CA (US); Nirav Salot, Pune (IN); Robert Marks, New Lenox, IL (US)

(73) Assignee: Cisco Technology, Inc., San Jose, CA (US)

( * ) Notice: Subject to any disclaimer, the term of this patent is extended or adjusted under 35 U.S.C. 154(b) by 223 days.

(21) Appl. No.: 12/955,080

(22) Filed: Nov. 29, 2010

(65) Prior Publication Data

US 2011/0286465 A1    Nov. 24, 2011

Related U.S. Application Data

(60) Provisional application No. 61/347,231, filed on May 21, 2010.

(51) Int. Cl.
| | | |
|---|---|---|
| *H04L 12/26* | (2006.01) | |
| *H04L 12/28* | (2006.01) | |
| *H04W 68/00* | (2009.01) | |
| *H04L 12/801* | (2013.01) | |
| *H04W 76/06* | (2009.01) | |

(52) U.S. Cl.
CPC .............. *H04W 68/00* (2013.01); *H04L 47/14* (2013.01); *H04W 76/066* (2013.01)
USPC .......................................... 370/401; 455/458

(58) Field of Classification Search
USPC .................. 370/229–235, 310, 401; 709/235; 455/458
See application file for complete search history.

(56) References Cited

U.S. PATENT DOCUMENTS

| | | | |
|---|---|---|---|
| 5,153,902 | A | 10/1992 | Buhl et al. |
| 5,940,762 | A | 8/1999 | Lee et al. |
| 5,995,832 | A | 11/1999 | Mallinckrodt |
| 6,438,383 | B1 | 8/2002 | Hall et al. |
| 6,553,217 | B1 | 4/2003 | Kundorf |
| 6,731,944 | B1 * | 5/2004 | Ostrup et al. ............ 455/458 |
| 6,748,247 | B1 | 6/2004 | Ramakrishnan et al. |
| 6,781,972 | B1 | 8/2004 | Anderlind et al. |
| 7,154,868 | B1 | 12/2006 | Sharma et al. |
| 7,289,480 | B2 | 10/2007 | Lundstrom et al. |

(Continued)

OTHER PUBLICATIONS

3GPP TS 23.401 v8.3.0 (Sep. 2008), 3rd Generation Partnership Project; Technical Specification Group Services and System Aspects; General Packet Radio Service (GPRS) enhancements for Evolved Universal Terrestrial Radio Access Network (E-UTRAN) access (Release 8), http://www.3gpp.org. 204 pages.

(Continued)

*Primary Examiner* — Hoon J Chung
*Assistant Examiner* — Yaotang Wang
(74) *Attorney, Agent, or Firm* — Wilmer Cutler Pickering Hale and Dorr LLP

(57) ABSTRACT

Prioritization of data traffic is a common technique for providing enhanced quality of service (QoS), allowing some traffic to reach its destination on an expedited basis without being obstructed or delayed by other lower-priority traffic. A mechanism is disclosed using the bearer architecture of the evolved packet core (EPC) to provide prioritization of traffic from specific packet data networks (PDNs), as well as over specific bearers. The priority information is requested by the mobile management entity (MME), which is commonly overloaded with traffic to and from multiple users and PDNs. In addition, a mechanism is provided for reducing the frequency of unwanted paging notifications for MMEs that are overloaded.

17 Claims, 8 Drawing Sheets

(56) References Cited

U.S. PATENT DOCUMENTS

| | | |
|---|---|---|
| 7,489,936 B1 | 2/2009 | Liu |
| 2002/0057649 A1 | 5/2002 | Kinnunen |
| 2002/0103922 A1* | 8/2002 | Arend et al. .................. 709/234 |
| 2002/0105970 A1 | 8/2002 | Shvodian |
| 2003/0026211 A1 | 2/2003 | Xu et al. |
| 2003/0221016 A1 | 11/2003 | Jouppi et al. |
| 2003/0235171 A1 | 12/2003 | Lundstrom et al. |
| 2004/0022212 A1 | 2/2004 | Chowdhury et al. |
| 2004/0022258 A1 | 2/2004 | Tsukada et al. |
| 2004/0109426 A1 | 6/2004 | Veerepalli et al. |
| 2004/0120283 A1 | 6/2004 | Rezaiifar et al. |
| 2004/0151155 A1 | 8/2004 | Jouppi |
| 2004/0152422 A1 | 8/2004 | Hoglund et al. |
| 2004/0203825 A1 | 10/2004 | Daniel et al. |
| 2004/0203894 A1 | 10/2004 | Watanabe et al. |
| 2004/0205247 A1 | 10/2004 | Ahn |
| 2005/0003856 A1 | 1/2005 | Jang et al. |
| 2005/0025116 A1 | 2/2005 | Chen et al. |
| 2005/0044138 A1 | 2/2005 | Albert et al. |
| 2005/0129013 A1 | 6/2005 | Rasanen |
| 2005/0136884 A1 | 6/2005 | Reidelsturz et al. |
| 2005/0149754 A1 | 7/2005 | Rasanen |
| 2005/0159167 A1 | 7/2005 | Hakalin et al. |
| 2006/0270422 A1* | 11/2006 | Benco et al. .................. 455/458 |
| 2007/0058561 A1* | 3/2007 | Virgile .......................... 370/252 |
| 2007/0230342 A1* | 10/2007 | Skog ............................ 370/232 |
| 2007/0259673 A1 | 11/2007 | Willars et al. |
| 2008/0028093 A1* | 1/2008 | Pickens et al. ............... 709/231 |
| 2008/0130568 A1 | 6/2008 | Gallagher et al. |
| 2009/0129307 A1 | 5/2009 | Akhtar et al. |
| 2009/0176513 A1 | 7/2009 | Bosch et al. |
| 2010/0075698 A1 | 3/2010 | Rune et al. |
| 2010/0124223 A1 | 5/2010 | Gibbs et al. |
| 2010/0220680 A1 | 9/2010 | Ramankutty et al. |
| 2011/0110378 A1* | 5/2011 | Savolainen et al. ........... 370/400 |
| 2012/0063464 A1 | 3/2012 | Mehta |
| 2012/0157132 A1* | 6/2012 | Olsson et al. ................. 455/458 |
| 2012/0264443 A1* | 10/2012 | Ng et al. ....................... 455/450 |

OTHER PUBLICATIONS

3GPP TS 23.402 v8.3.0 (Sep. 2008), 3rd Generation Partnership Project; Technical Specification Group Services and System Aspects; Architecture enhancements for non-3GPP accesses (Release 8), http://www.3gpp.org. 190 pages.

3GPP TS 29.212 v8.1.0 (Sep. 2008), 3rd Generation Partnership Project; Technical Specification Group Core Network and Terminals; Policy and Charging Control over Gx reference point (Release 8), http://www.3gpp.org. 60 pages.

Alcatel-Lucent. "MME Overload Control by Throttling of DL Low Priority Traffic." Mobile Competence Centre. Meeting #81. Prague, Czech Republic. Oct. 11-15, 2010. 7 pages.

Alcatel-Lucent. "NIMTC-MME-SGSN Overload Control by DL MTC Traffic Throttling." 3GPP Draft; S2-102488, Mobile Competence Centre; 650, Route Des Lucioles; F-06921, France. vol. SA WG2, Meeting # 79. Kyoto, Japan. May 10-14, 2010. 2 pages.

Huawei. "IMS Multimedia Priority Services Solution for eMPS." 3GPP Draft; S2-101087, Mobile Competence Centre. Meeting #77. San Francisco, Feb. 22-26, 2010. 4 pages.

International Search Report and Written Opinion for International Application No. PCT/US11/37407 mailed Jul. 27, 2011. 13 pages.

International Search Report and Written Opinion issued for PCT/US09/64979, mailed Feb. 25, 2010 (7 pages).

* cited by examiner

US 8,861,535 B2

MULTI-TIERED PAGING SUPPORT USING PAGING PRIORITY

CROSS-REFERENCE TO RELATED APPLICATIONS

This application claims benefit under 35 U.S.C. §119(e) of U.S. Provisional Patent Application No. 61/347,231, "Efficient and Predictable Paging Support During Overload Conditions," filed May 21, 2010, which is hereby incorporated by reference herein in its entirety.

TECHNICAL FIELD

The present disclosure relates generally to a mechanism for providing paging services for mobile stations in wireless networks. More specifically, the present disclosure relates to a mechanism for providing multi-tiered paging support using paging priority.

BACKGROUND

In the field of wireless networking, modern mobile stations, such as cell phones or wireless broadband-equipped laptops, typically utilize a radio access network (RAN) to connect to a packet data network (PDN), by which they gain access to hosts on the Internet via Internet Protocol (IP). This connectivity is provided by mobile network operators, which build and maintain networks of radio access points, networking switches and gateways, and high-bandwidth links that are compliant with certain standards. One such standard is called Long-Term Evolution (LTE). The LTE standards are published by the 3$^{rd}$ Generation Partnership Project ("3GPP"), a not-for-profit industry consortium.

Mobile stations that provide IP packet-based connectivity are supported by networking gateways that send packets downstream to the mobile stations and receive packets from the mobile stations addressed for upstream network nodes or network nodes on the public Internet. When a gateway informs an inactive mobile station that new packets have arrived for that mobile station, this process is known as paging.

DESCRIPTION OF EXAMPLE EMBODIMENTS

Overview

Systems and methods are described that provide paging support using a paging priority at a management gateway. In one embodiment, a method is disclosed that includes storing a paging priority value associated with a bearer, wherein the paging priority value is sent from a management gateway and received at a forwarding gateway; storing a priority threshold associated with a mobile device and a packet delivery network, wherein the priority threshold is sent from a management gateway and received at a forwarding gateway; comparing the priority value and the priority threshold after a packet is received at the forwarding gateway from the packet delivery network for the mobile device over a bearer, wherein the forwarding gateway communicates with the mobile device via a bearer; and sending a data arrival notification from the forwarding gateway to the management gateway if the priority value exceeds the priority threshold, and not sending the data arrival notification if the priority value does not exceed the priority threshold.

Example Embodiments

The Long-Term Evolution (LTE) standard includes a radio access network using a technology called evolved universal terrestrial radio access network (EUTRAN) for communicating with a wireless mobile device or user equipment (UE), and a packet-based backbone collectively called the System Architecture Evolution (SAE) core network. As part of the EUTRAN, an eNodeB (base station) is responsible for providing a wireless air interface and for bridging UEs to the SAE core network over a wired connection. The SAE core network includes management gateways such as mobility management entities (MMEs), forwarding gateways such as serving gateways (SGWs), and packet data network gateways (PGWs).

It is desirable to manage the frequency of new packet notifications for mobile stations that are idle. A mechanism is disclosed using a bearer architecture of the EPC to provide tiered notification of traffic from specific packet data networks (PDNs), as well as over specific bearers. Priority information is requested by a mobile management entity (MME), which can be overloaded with traffic to and from multiple users and PDNs. In addition, a mechanism is disclosed for reducing the frequency of unwanted downlink data notifications (DDNs), for MMEs that are overloaded.

Figure 1:
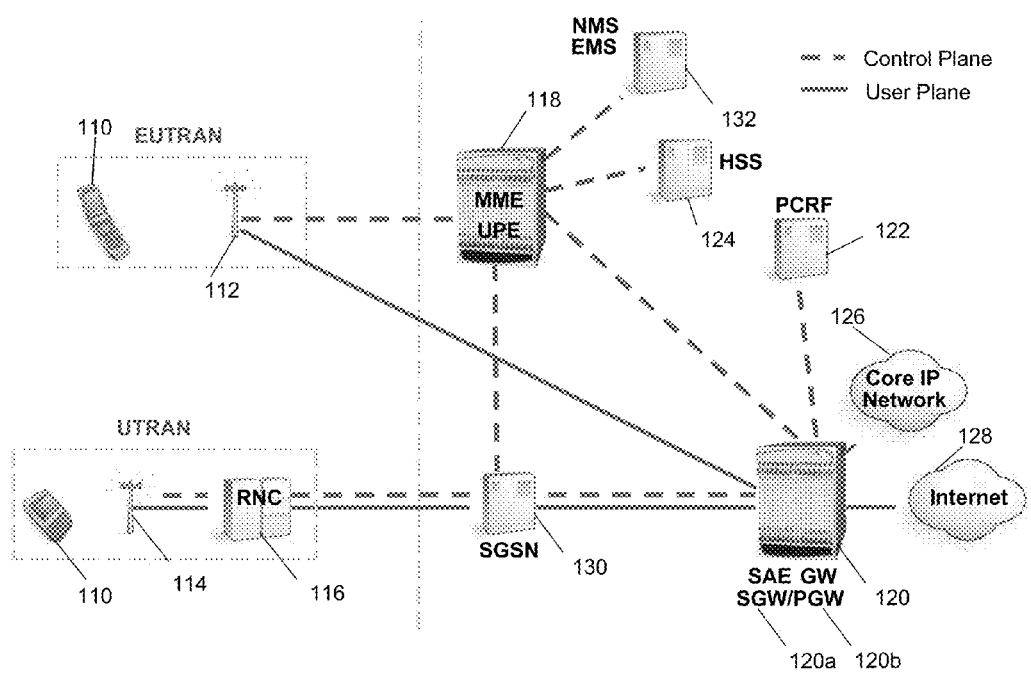
FIG. 1 is a schematic representation of a wireless data network supporting paging of a mobile station.

FIG. 1 illustrates a universal mobile telecommunication system (UMTS) release 8 network along with a LTE network that includes bearer paging priority in accordance with certain embodiments. The network of FIG. 1 includes a user equipment (UE) 110, an evolved nodeB (eNB) 112, a nodeB 114, a radio network controller (RNC) 116, a mobility management entity (MME)/user plane entity (UPE) 118, a system architecture evolution gateway (SAE GW) 120, a policy and charging rules function (PCRF) 122, a home subscriber server (HSS) 124, a core IP network 126, the Internet 128, a Serving General packet radio service Support Node (SGSN) 130, and a network management system (NMS)/element management system (EMS) 132. MME 118, SGSN 130, and SAE GW 120 can be implemented in a gateway as described below. SAE GW 120 can include a serving gateway (SGW) 120a as well as packet data network gateway (PGW) 120b. In some embodiments, SGW 120a and PGW 120b can be implemented on separate network devices. The system architecture evolution (SAE) architecture includes an Evolved Packet Core (EPC), also known as a SAE Core network. The EPC includes the MME, SGW and PGW components. UE 110 can include a mobile phone, a laptop with wireless connectivity, a netbook, a smartphone, or any other wireless device.

MME 118 is a control node for the LTE access network. MME 118 is responsible for UE tracking and paging procedures including retransmissions. MME 118 handles the bearer activation/deactivation process and is also responsible for choosing SGW 120a for UE 110 at the initial attach and at time of an intra-LTE handover. MME 118 also authenticates the user by interacting with HSS 124. MME 118 also generates and allocates temporary identities to UEs and terminates Non-Access Stratum (NAS) signaling. MME 118 checks the authorization of UE 110 to camp on a service provider's Public Land Mobile Network (PLMN) and enforces UE roaming restrictions. MME 118 is the termination point in the network for ciphering/integrity protection for NAS signaling and handles the security key management. Lawful interception of signaling is also supported by MME 118. MME also provides control plane functions for mobility between LTE and 2G/3G access networks using a S3 interface terminating at MME 118 from SGSN 130. MME 118 also terminates a S6a interface towards the home HSS for roaming UEs.

SGW 120a routes and forwards user data packets, while also acting as a mobility anchor for the user plane during inter-eNB handovers, and as an anchor for mobility between LTE and other 3GPP technologies (terminating a S4 interface and relaying the traffic between 2G/3G systems and PDN GW). For idle state UEs, SGW 120a terminates a downlink data path and triggers paging when downlink data arrives for UE 110. SGW 120a manages and stores UE contexts, e.g., parameters of the IP bearer service and network internal routing information. SGW 120a also performs replication of user traffic in case of lawful interception. PGW 120b provides connectivity to UE 110 to external packet data networks by being the point of exit and entry of traffic for UE 110. UE 110 may have simultaneous connectivity with more than one PGW for accessing multiple packet data networks. PGW 120b performs policy enforcement, packet filtering for each user, charging support, lawful interception, and packet screening. PGW 120b also provides an anchor for mobility between 3GPP and non-3GPP technologies such as WiMAX and 3GPP2 (CDMA 1X and EvDO).

NMS/EMS 132 can provide management of the operation, administration, maintenance, and provisioning of the network. Operation deals with keeping the network (and the services that the network provides) up and running smoothly, and includes monitoring to detect problems and minimize disruptions on the network. Administration deals with keeping track of resources in the network and how they are assigned. Maintenance is concerned with performing repairs and upgrades—for example, when equipment is replaced, when a router needs a patch for an operating system image, and when a new switch is added to a network. Provisioning is concerned with configuring resources in the network to support a given service. For example, this might include setting up the network so that a new customer can receive service. Functions that are performed as part of network management accordingly include controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, and accounting management. An element management system (EMS) includes systems and applications that manage network elements (NE) on the network element management layer (NEL) of the Telecommunication Management Network model.

As mentioned above, UE 110 may be in an active or an idle state. Whether UE 110 is in an active state can depend on the state of a packet data session, and whether there is an active packet data session. The idle state is a sleep mode state that can be used to conserve battery life of user equipment by minimizing the need to power receivers to be ready for radio signals. For user equipment in an idle state, SGW 120a can buffer IP packets received for the user equipment and can initiate page requests towards MME 118 or SGSN 130 with a downlink data request (DDR). MME 118 then manages the paging procedure and relieves control-plane management from each EMS 132. Paging indicators are usually broadcast from a number of cells because user equipment may move while in an idle state. If UE 110 responds to the page, SGW 120a forwards the IP packet to eNodeB 112 in a LTE network or to a RNC/NB or RNC/BS in a UMTS/general packet radio service (GPRS) network for delivery to the UE.

MME 118 is a management gateway that is responsible for tracking and paging procedures involving UEs, creating and deactivating bearers, and choosing a SGW for a UE when it attaches to the MME. SGW 120a is a forwarding gateway that is responsible for serving as the mobility anchor for a UE, as well as for forwarding and routing packets. PGW 120b is responsible for providing connectivity from the EPC to external packet data networks such as the Internet. Data traffic flows through SGW 120a and PGW 120b directly to eNodeB 112, and from eNodeB 112 to UE 110. MME 118 handles control plane traffic for several UEs, which includes paging traffic. As a result, excessive paging may cause MME 118 to become overloaded.

In its gateway capacity, PGW 120b is also responsible for policy enforcement, packet filtering, charging, quality of service (QoS), and lawful intercept functions. The EPC/SAE network is designed to be interoperable with additional wireless technologies and air interfaces, such as WiMAX and evolved high rate packet data (eHRPD), as well as with EUTRAN.

When UE 110 requests IP services, an IP connectivity access network (IP-CAN) bearer, or evolved packet switch (EPS) bearer, is required to provide connectivity from UE 110 to SGW 120a and back. The EPS bearer is effectively an end-to-end IP path defined to a specific QoS. Parts of the EPS bearer may use IP tunneling. The EPS bearer is similar to a packet data protocol (PDP) context in the general packet radio service (GPRS) core network, which is a precursor of LTE, and includes a radio bearer between UE 110 and eNodeB 112, an S1 bearer between eNodeB 112 and SGW 120a, and an S5/S8 bearer between SGW 120a and PGW 120b, which is responsible for providing service to an external packet delivery network. A generic IP tunnel or IP path may substitute for a bearer in some embodiments.

Like a PDP context, the EPS bearer includes a data structure maintained by MME 118 and SGW 120a that includes subscriber information and session information, identifying the traffic flow carried by the bearer. This may take the form of a bearer ID. When data is delivered from the SAE core network to SGW 120a, SGW 120a uses bearer information to direct the incoming packets to correct UE 110. UE 110 likewise attaches bearer information to IP traffic bound for the SAE core network, which SGW 120a uses to maintain IP sessions and direct packets to their destinations. The bearer also carries QoS information that applies to the traffic flow carried by the bearer.

When UE 110 attaches to a new radio access network (RAN), UE 110 requests IP connectivity, and a bearer may be allocated by MME 118 and SGW 120a for providing IP services. This bearer is created, allocated and tracked by MME 118, so that when UE 110 moves from a particular RAN and eNodeB to another RAN, it can share the same bearer at MME 118. Data is sent via the bearer in conjunction with a S1-U tunnel from SGW 120a to attached eNodeB 112. If UE 110 goes idle, it is permissible for eNodeB 112 and SGW 120a to deallocate radio resources.

Downlink data paging is the process by which an inactive UE is contacted to receive data from an upstream source over the packet data network. A UE that is in an active state is associated with an eNodeB and has at least one active bearer. When the UE goes inactive, such as when it enters a low-power mode, it releases all bearers. To find an inactive UE, MME 118 issues to multiple eNodeBs a paging request, which may be an expensive operation.

When data arrives at SGW 120*a* for UE 110, SGW 120*a* may inform the relevant MME, in this case MME 118, that data has arrived using a downlink data notification (DDN) message. Subsequently, MME 118 may page UE 110, and may reestablish an S1-U tunnel if necessary from SGW 120*a* to eNodeB 112 using a Modify Bearer Request (MBRq) message. The data may then be requested by UE 110 and retrieved over the preexisting bearer.

A DDN message need not be sent by SGW 120*a* to the MME 118 every time new upstream data is received at SGW 120*a*. Instead, once a DDN message is sent, SGW 120*a* typically does not send another DDN and instead waits for MME 118 to respond with a message indicating that the DDN message has been received. This message may be a MBRq message or a DDN Acknowledgement message. Once the DDN message has been acknowledged, SGW 120*a* does not need to send additional DDN messages until a delay value timer has expired, indicating that a new DDN message should be sent. The delay value timer has a value which may be provided by MME 118 in a DDN Acknowledgement message and which may be per-node, e.g., specific to UE 110 or to the particular packet data network that is the source of the incoming traffic.

In an overload condition in which MME 118 is overloaded, MME 118 may not receive DDN messages from SGW 120, (which may also be overloaded), it may not page all the UEs for which it has received DDN messages, and it may fail to respond to SGW 120*a* with DDN acknowledgments. MME 118 may also become unable to page a UE during emergency events with the appropriate messages, e.g., Emergency Calls or Amber Alerts. Several enhancements to a paging architecture are described below which can mitigate issues that may arise in an overload situation. In addition, overloaded MME 118 can be enhanced to prioritize emergency services, as well as non-emergency services.

In some embodiments and as described below, for every bearer a MME may provide an integer-valued bearer priority value during bearer creation to a SGW. This information element may be included in Create Session Request messages, Create Bearer Response messages, or other messages between the MME and the SGW. The bearer priority value may then be stored by the SGW and/or the MME. As different bearers may have differing needs, such as for latency, QoS or emergency access, each bearer has its own bearer priority, which is created on bearer creation and stored in association with the bearer.

Bearer priority enables selective paging, in which the SGW is enabled to selectively page UEs with high-priority bearers. A UE may also have several bearers, each with different priorities, so that bearers providing emergency services may be given a higher priority than bearers providing user-accessed multimedia content, which, in turn, may be given a higher priority than bearers providing static text content. The specific allocation of bearer priority values may be determined by the content provider, by the user, by the UE, by other elements of the network, or by automated or semiautomated combinations of the above.

Bearer priority may interact with another integer value called Bearer Paging Priority (BPP). The BPP is a threshold that applies to all bearers, so that the arrival of packets on a bearer may trigger a DDN message at the SGW to be sent immediately. For every upstream network, or packet data network (PDN), that a UE is in communication with, the MME designates a BPP value during access bearer release. This may be piggybacked onto the Release Access Bearer Request message. This BPP reflects the priority of incoming data traffic on that particular upstream PDN. A default value may be provided in some embodiments, such as a value of 0, which results in non-prioritized, non-blocking behavior.

One way that a BPP can interact with bearer priority is as follows. A UE may be exchanging data with more than one remote host on a given PDN, resulting in several bearers delivering packets to, and receives packets from, multiple hosts via the PDN. The bearers may each have their own bearer priority, reflecting the priority of a given IP traffic stream. The bearers are then released using a radio access bearer (RAB) release request. When a SGW subsequently receives incoming data from the PDN, it may check the bearer priority of the bearer associated with the traffic and compare it with the BPP associated with the PDN. If the bearer priority is greater than or equal to the BPP threshold, it may trigger the SGW to send a DDN message immediately to the affected MME, which may then page the UE to become active and retrieve the data. If instead the bearer priority is less than the BPP, the SGW may take no action, or it may wait until the delay timer has expired to send a DDN message to the MME. This action can prevent the MME from receiving repeated notifications about lower-priority data events, and can avoid potentially overloading the MME with control-plane paging requests.

In some embodiments, LTE and the GPRS tunneling protocol (GTP) are used, which incorporate a QoS model for EPS bearers that permits the inclusion of an Allocation and Retention Priority (ARP) parameter. This parameter is provided as having an integer range from 1-15, and may be implemented to include a bearer priority value, with 1 being the value corresponding to the highest priority. For messaging between the MME to the SGW, the ARP may be included as a parameter in the GTPv2 Downlink Data Notification Acknowledgement message, which requires no new messaging protocols to be implemented between the MME and the SGW. In some embodiments, if a bearer priority is not provided by the MME, an available ARP value may be used as a default bearer priority.

The described system may permit the MME to intelligently regulate paging during overload for efficiency and predictability by dynamically determining which paging requests to drop during overload conditions. One possible means for managing an overload condition at an MME is for the SGW to regulate DDN messages by not delivering DDN messages on an immediate basis and only sending DDN messages for bearers which are designated as high priority. This approach can ensure that additional DDN messages are not sent by the SGW while an MME is overloaded. This regulation mechanism would be under the control of the MME, as the MME is able to send BPP information to the SGW indicating which bearers are higher priority than others.

The BPP may provide a mechanism for the MME to explicitly indicate its paging preference to the SGW. The BPP may also allow the MME to dynamically alter the tiered paging service based on load conditions because the BPP is applied to all bearers providing connectivity to a given packet data network. By sending a single BPP message, the MME can direct the SGW to provide more or less frequent DDN notifications. An example of the use of this feature would be for an overloaded MME to send a message to an SGW to increase the BPP threshold for all UEs. This would result in fewer incoming DDN messages for the MME, ideally resulting in less load and mitigating the overload condition. The same UE may thus be subject to a different BPP at different times.

The described system permits the MME to provide a tiered paging service, providing differentiation at the individual subscriber level. This service may be used at any load condition, including for overload. This may be done by allocating different priority ranges for different UEs. For example, one UE may be allocated a priority range of 1 to 3, where 1 is the highest priority, while another UE is allocated a priority range of 1 to 5, and another UE is allocated a priority range of 10 to 15. This allows some subscribers to be given higher priority service and more immediate data notification. Combined with the association of the BPP with individual packet data networks, this allows the MME to provide fine-grained prioritization for different packet delivery needs at all times, including during overload conditions. For example, packet data traffic from the service provider's PDN may be set at a higher priority than packet data from the public Internet using this method.

A tiered priority system may also allow the SGW to send DDN messages in situations where they would not ordinarily be sent. In a typical DDN implementation, if the MME indicates that it is overloaded by failing to respond to a DDN message, further DDN messages are not sent, or are delayed until the expiration of the delay value timer described above. All packet flows are thus delayed until the delay value timer has expired. In a tiered priority system in accordance with some embodiments, a second DDN message may be sent immediately if the priority of the traffic exceeds the appropriate priority threshold. Setting a threshold for subsequent DDN messages allows one or more follow-on DDN messages to be sent in some circumstances before the delay value timer has expired. Each follow-on DDN message may be handled independently, without reference to previous delay value timer values. A threshold may be implemented even when the MME is not overloaded. The MME may also be configured to perform other functions according to the bearer paging priority values of the various UEs, such as implementing a paging strategy wherein higher-priority UEs are paged first or are paged more persistently than other UEs. The bearer paging priority may also be used to provide priority differentiation of users at the individual subscriber level.

Figure 2:
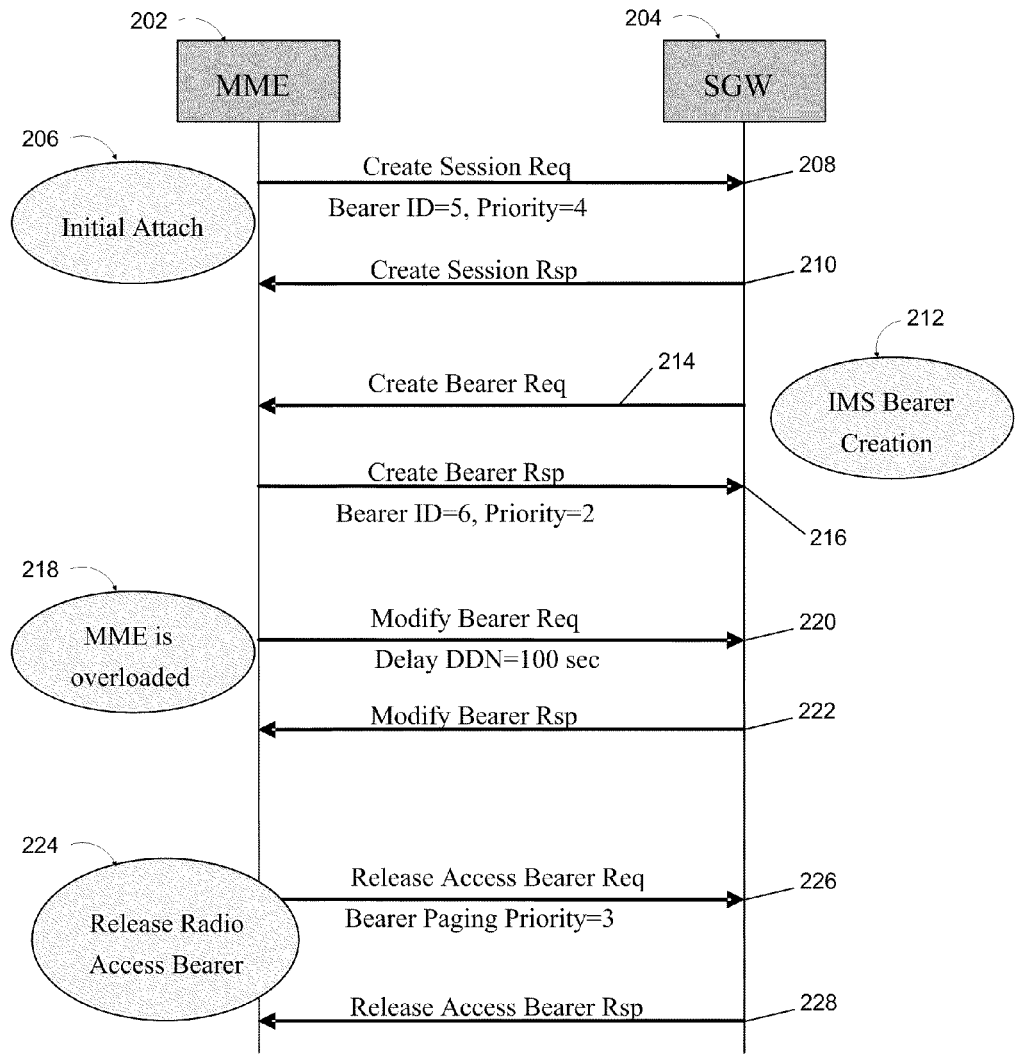
FIG. 2 is a signaling diagram of communication between a mobile device and a wireless data network during bearer creation, in accordance with certain embodiments.

FIG. 2 is a call flow diagram representative that illustrates the steps involved in bearer creation in some embodiments. Mobile Management Entity (MME) 202 desires to initiate a packet data session with serving gateway (SGW) 204. In initial attach process 206, MME 202 initiates the creation of a bearer by sending a Create Session request 208 to SGW 204. The Create Session request 208 includes a bearer ID, sometimes referred to as an EPS Bearer ID (EBI), that describes and identifies the information flow between MME 202 and SGW 204. This is roughly equivalent to a PDP context in 2G/2.5G systems. The EPS bearer itself includes an S5 bearer between SGW 204 and a PGW (not shown), an S1 bearer between SGW 204 and an eNodeB (not shown), and a radio bearer between the eNodeB and the mobile device (not shown). In FIG. 2, the bearer created by Create Session Request message 208 has a bearer ID of 5. It additionally has a bearer priority value of 4 which relates to the specific bearer. Once the Create Session request 208 is issued by MME 202, SGW 204 receives request 208, processes it by creating the requested bearer, and acknowledges the request with a Create Session Response 210. Response 210 signals to MME 202 that the bearer is established.

In some circumstances, an IMS core network may initiate the creation of a bearer, as indicated in IMS bearer creation state 212. To create the bearer, SGW 204 receives data from the IMS network (not shown) and subsequently sends Create Bearer Req 214 to MME 202. Once MME 202 receives Create Bearer Req 214, MME 202 sets up an S1 bearer and/or a radio bearer to the mobile device, and sends Create Bearer Resp 216 as confirmation to SGW 204. MME 202 dictates the terms of the bearer, setting the bearer ID to 6 (or some other unique value) and setting the priority of traffic on this bearer to 2. Although different value ranges can be used for priority, in FIG. 2 a priority of 2 signifies higher priority traffic than a priority of 4.

In the case where MME 202 is overloaded, indicated at reference number 218, MME 202 may request SGW 204 to reduce the frequency at which it sends downlink data notifications. The MME 202 sends a requested value for a delay value timer, here shown as 100 seconds, which expires before new notifications are sent. In some embodiments, the delay value timer is associated with the bearer, and MME 202 sends a request for a change to this value as part of the Modify Bearer Req 220. In other embodiments, the delay value timer may not be associated with a bearer but may be a global value. The timer value may still be sent as part of a Modify Bearer Req. SGW 204 responds with a Modify Bearer Resp 222. SGW 204 will now be configured to not send downlink data notifications until the specified delay time has elapsed.

At reference number 224, MME 202 sends a Release Access Bearer (RAB) Req to SGW 204. This is a message sent when MME 202 wishes to destroy a radio access bearer, and is typically used when a UE enters an idle state to deallocate radio access bearers. The RAB request may contain additional information indicating which bearers should be deallocated and destroyed by including bearer IDs for identifying the affected bearers. (Message 226 does not show the values for bearer ID. In some embodiments an empty bearer ID may be used.) Following a RAB request, the radio bearers are released, but the bearers at the MME and the SGW are not released and may be used to forward traffic and reactivate the mobile device.

Message 226 is also used to piggyback a Bearer Paging Priority (BPP) value of 3 to SGW 204. The BPP is thereafter used by SGW 204 to ensure that only bearers considered to be high priority may trigger the SGW to send a downlink data notification message. The bearer with bearer ID 6, established by messages 214-216 and having a priority of 2, will thus cause a downlink data notification to be sent, while the bearer with bearer ID 5, with priority 4, will not cause a downlink data notification to be sent. The BPP takes priority over the downlink data notification delay, so that high priority messages from the bearer with bearer ID 6 will cause a downlink data notification to be sent immediately, while all other downlink data notification requests from lower priority bearers will be forced to wait for the delay value timer before sending a downlink data notification. SGW 204 responds with Release Access Bearer response 228.

Figure 3:
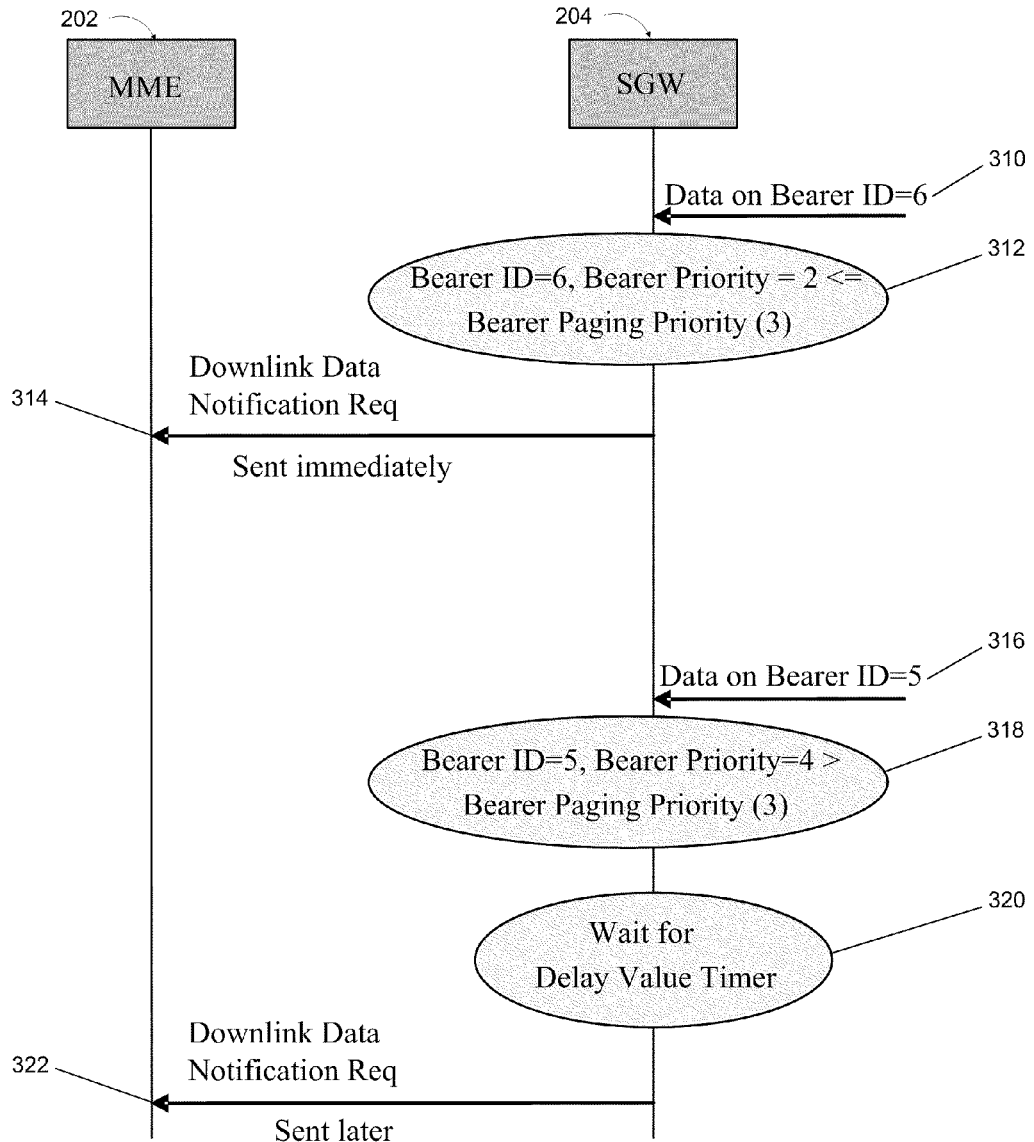
FIG. 3 is a signaling diagram of communication between a mobile device and a wireless data network during paging of the mobile device, in accordance with certain embodiments.

FIG. 3 is a call flow diagram representative of some embodiments that illustrates the same system established in FIG. 2, while providing more detail into the logical state of SGW 204. Bearer ID=5 and bearer ID=6 have been established as described in FIG. 2. At step 310, SGW 204 receives data on bearer ID=6. This causes SGW 204 to check at step 312 whether the priority on the bearer is less than or equal to the global Bearer Paging Priority (BPP). Since the bearer priority is 2, and this is higher priority than the current BPP of 3, a downlink data notification (DDN) request is sent immediately at step 314 to MME 202, which initiates paging of the user's mobile device via the radio access network.

At step 316, SGW 204 receives data on bearer ID=5. This causes SGW 204 to check at step 318 whether the priority on the bearer is less than or equal to the BPP, and since the bearer priority of 4 is lower than the BPP of 3, the traffic is deemed not high enough priority and is forced to wait for the delay value timer to expire at step 320 before sending a downlink data notification request at step 322. The received packets are buffered and sent later following the downlink data notification request. This results in the UE not receiving the data for at least the duration of the delay.

Figure 4:
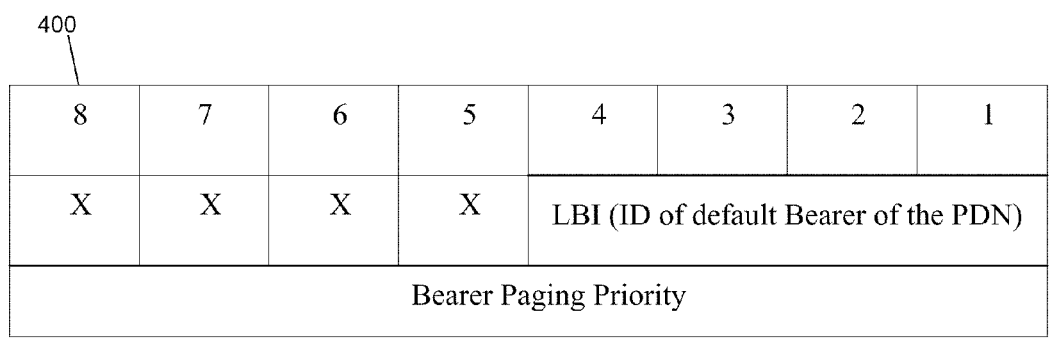
FIG. 4 is a representative diagram of the format of a bearer paging priority message, in accordance with certain embodiments.

FIG. 4 represents a message structure which may be used to communicate bearer paging priority (BPP) information in some embodiments. In data structure 400, two 8-bit words are represented, with 8 being the most significant bit (MSB) and 1 being the least significant bit (LSB). The first 4 bits of the first word are ignored. The second 4 bits of the first word are used to deliver the linked bearer identity (LBI), which is the bearer ID of the default bearer for a particular packet data network. One such message can be sent for each packet data network used or connected to a MME. The second data word uses all 8 bits to set a value for the BPP. This data structure or information element is piggybacked onto the release access bearer request (see FIG. 2) or other requests or messages in some embodiments. Other data structures may be used to accomplish the same purpose in some embodiments.

Figure 5:
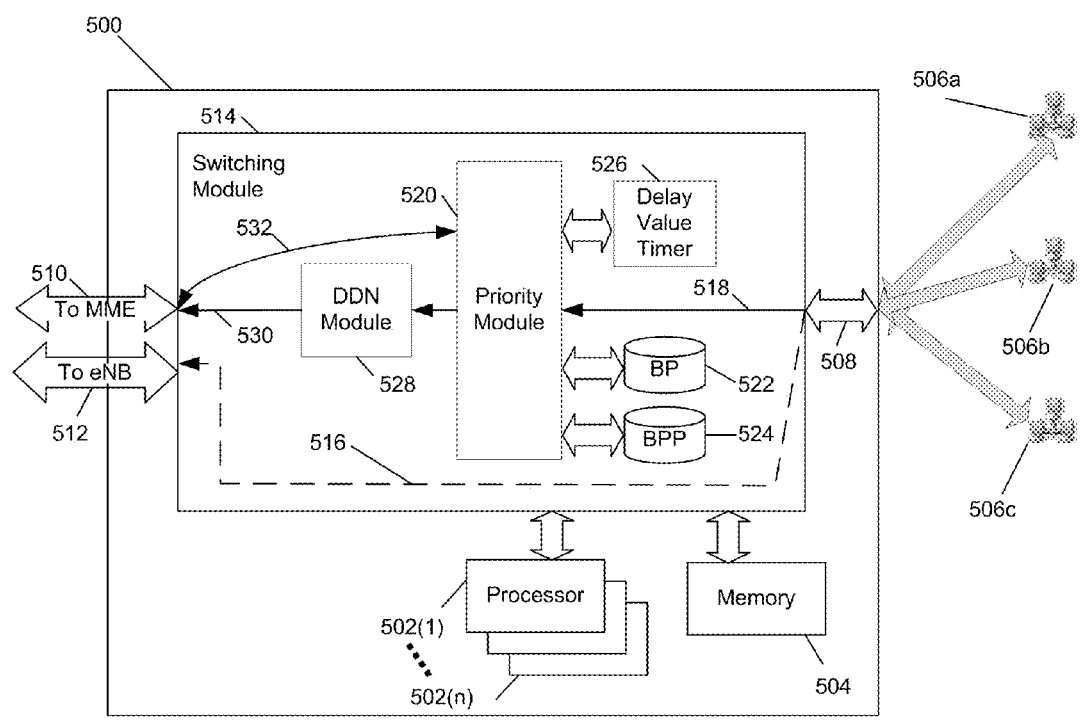
FIG. 5 is a block diagram of a serving gateway focusing on the flow of bearer priority information, in accordance with certain embodiments.

FIG. 5 is a block diagram of a representative bearer priority module in a serving gateway (SGW) in accordance with some embodiments. SGW 500 includes one or more processors 502(1)-502(n) and memory 504, and is responsible for delivering data packet flows from various packet data networks 506a, 506b, 506c to a mobile device, and for receiving bearer priority values from a mobility management entity (MME) (not shown). Communications with packet data networks 506a-506(c) are via network interface 508, and communications with the MME are via network interface 510. Data traffic is sent separately via network interface 512, bypassing the MME and directed to one or more eNodeBs (not shown). When a radio access bearer is active for a UE (not shown) and end-to-end IP connectivity is available, data passes through SGW 500 from PDNs 506a-c through switching module 514. This occurs via data path 516, network interface 512, and the eNodeB associated with the UE (not shown).

When a UE releases all of its radio access bearers, no end-to-end IP connectivity is available. In this case, SGW 500 responds to the receipt of a data packet for the UE at interface 508 by passing the data packet to switching module 514 and via data path 518 to priority module 520. Priority module 520 is responsible for correlating the specific UE and PDN with a per-bearer bearer priority value in data store 522 and with a per-PDN, per-UE bearer paging priority value in data store 524. Priority module 520 also consults delay value timer 526 to decide whether to generate a downlink data notification (DDN) message. Downlink data notification (DDN) module 528 is responsible for handling downlink notifications. If the priority of the bearer associated with the incoming message is higher than the Bearer Paging Priority, priority module 520 instructs DDN module 528 to send out a DDN to the UE, via data path 530 and network interface 510. If the priority of the incoming message is not high enough, priority module 526 operates in conjunction with delay value timer 526 to delay sending the DDN. Other operations are also possible in some embodiments, as described above. Switching module 514 also is capable of receiving and setting bearer priority and Bearer Paging Priority values from a MME (not shown) via network interface 510 and data path 532.

Figure 6:
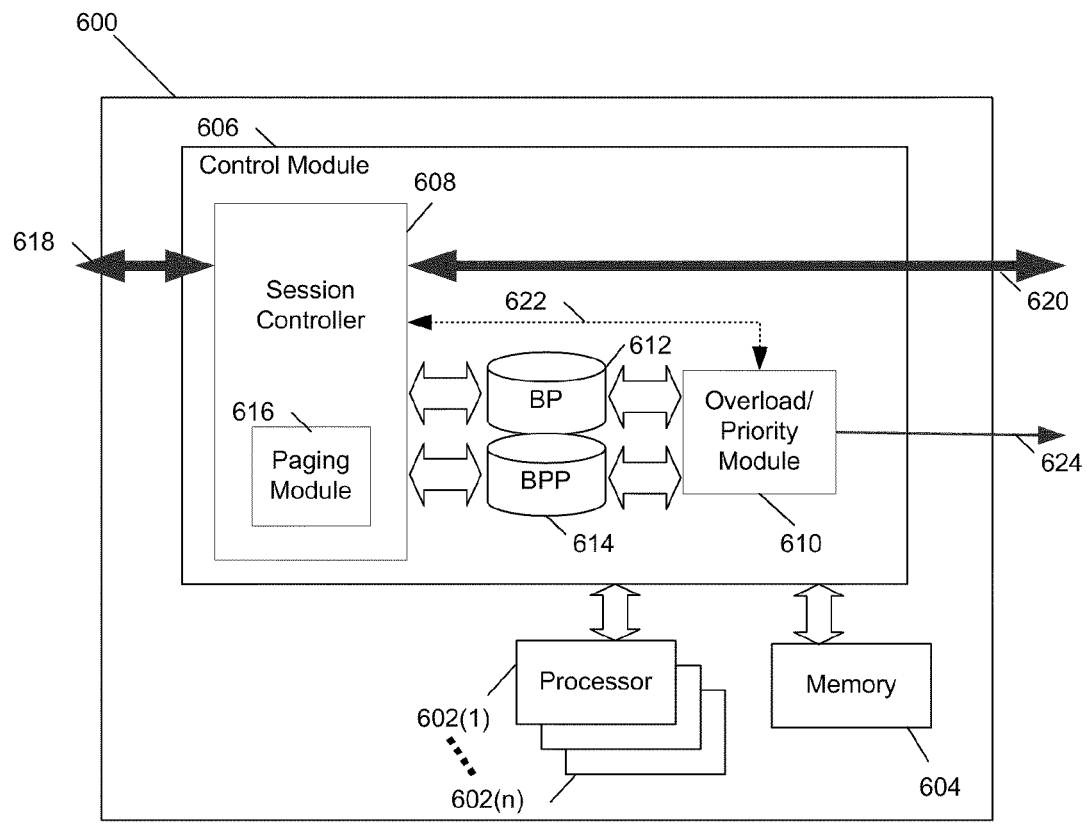
FIG. 6 is a block diagram of a mobile management entity focusing on the flow of bearer priority information, in accordance with certain embodiments.
Figure 7:
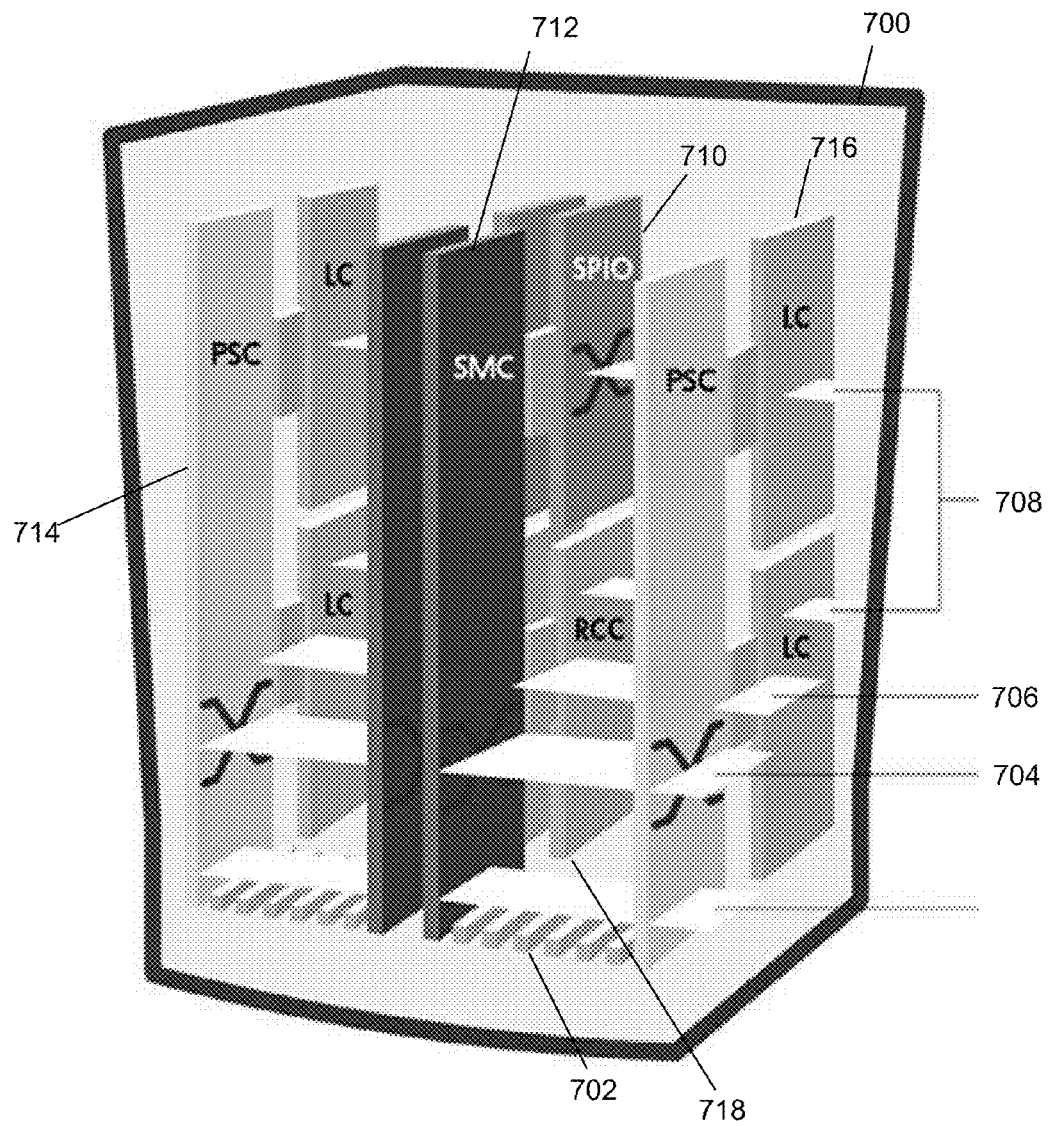
FIGS. 7-8 illustrate a gateway in accordance with certain embodiments.

FIG. 6 is a block diagram of a representative bearer priority module in a mobile management entity (MME) in accordance with some embodiments. The MME is the network node that sends bearer priority information to SGW 500, described in FIG. 5 and accompanying text. MME 600 includes processor(s) 602(1) . . . 602(n), which execute instructions stored in memory 604. MME 600 also includes control module 606, which includes session controller 608, overload/priority module 610, data store 612 for storing bearer priority, and data store 614 for storing Bearer Paging Priority. Overload/priority module 610 may permit MME 600 to assess its relative load and determine whether it is in an overloaded or heavily-loaded state. This information is then used to set and request an appropriate level of DDN notification from upstream SGW 500. Session controller 608 manages sessions between user equipment (UE) and a core network (not shown), performing functions that may include establishing radio access bearers and bearers connected to the core network, and serving as a mobility anchor for roaming UEs. Session controller 608 also includes paging module 616, which performs functions which may include paging unavailable or idle UEs, maintaining tracking area lists for unavailable or idle UEs. In some embodiments, session controller 608 may include all of the above modules. In other embodiments, MME 600 may be implemented on the same network node as SGW 500.

In operation, MME 600 receives control plane packets from UEs (not shown) via data path 618. MME 600 communicates with upstream SGW 500 via data path 620. Additionally, overload/priority module 610 is capable of communicating with upstream SGW 500 as well. This may be via data path 624, as shown, or over data path 620, or via a combined network interface. MME 600 is in communication with a UE (not shown) over data path 618. Session controller 608 creates a bearer for the UE and assigns a bearer priority value to the bearer. This bearer priority is included in a Create Session Request message or a Create Bearer Response message sent to SGW 500 via data path 620, and is also stored together with its associated bearer in data store 612 by session controller 608. SGW 500 then receives the bearer priority value and stores it as described in FIG. 5 and its corresponding text. The creation of bearers and the assignment of bearer priority values takes place while an active radio access bearer exists with the UE via a radio access network (not shown).

When the UE enters an idle mode, in some cases without contacting the MME, it becomes unavailable. MME 600 is responsible for determining when the UE becomes unavailable, and once a UE becomes unavailable, contacting each PDN that the UE is in communication with via SGW 500 with a corresponding Release Access Bearer (RAB) request. MME 600 may specify a Bearer Paging Priority value in the RAB release request. Session controller 608 may communicate with overload/priority module 610 via data path 622 and apply heuristics, including the amount of load on processor(s) 602(1) . . . 602(n), the number of UEs connected to MME 600, and any service agreement in place for the specific user or PDN, when determining the BPP value. If MME 600 is heavily loaded, it may not be able to apply heuristics, in which case the overload/priority module 610 may have other processes in place that allow it to determine BPP with a minimum of processing time. If MME 600 is not loaded or a non-blocking BPP is desired, a priority of 0 may be selected. A different BPP value may be provided for each PDN and for each UE. Overload/priority module 610 may provide a BPP value even when MME 600 is not overloaded. Conversely, the BPP value can be used to signal to SGW 500 that there is an overload condition at the MME. The selected BPP value is stored in data store 614 on a per-PDN, per-UE basis, and transmitted to SGW 500 in the RAB release request. SGW 500 stores the BPP value.

When SGW 500 subsequently receives data for the UE from a particular PDN, it checks the stored BPP value and determines whether to send a downlink data notification (DDN). SGW 500 is responsible for correctly applying the BPP value. Once MME 600 receives a DDN, it immediately begins the paging procedure for the UE, without regard for any bearer priority or bearer paging priority for that UE.

User Equipment and Gateway

The user equipment described above can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as Symbian OS, Apple iOS, RIM's Blackberry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The serving gateway and mobile management entity (MME) described above may be implemented independently or in conjunction on an integrated network device in some embodiments. This network device can implement multiple and different integrated functionalities. In some embodiments, one or more of the following functionalities can be implemented on the network device, including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The network device can also support sessions originated from a Femto base station, which would connect to the network device using a broadband network. A person or corporation may use a Femto base station in a home or business to support one or more mobile nodes. The network device can provide trigger based traffic management during a handoff from a Femto base station to a macro base station, while maintain traffic management for the mobile node. The network device can be implemented as any combination of the following including an xGSN, an xGW, an xGW-SGW, and an xGW-PGW.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 6 illustrates the implementation of a network device in accordance with some embodiments. The network device 700 includes slots 702 for loading application cards and line cards. A midplane can be used in the network device to provide intra-network device communications, power connections, and transport paths between the various installed cards. The midplane can include buses such as a switch fabric 704, a control bus 707, a system management bus, a redundancy bus 708, and a time division multiplex (TDM) bus. The switch fabric 704 is an IP-based transport path for user data throughout the network device implemented by establishing inter-card communications between application cards and line cards. The control bus 706 interconnects the control and management processors within the network device. The network device management bus provides management of system functions such as supplying power, monitoring temperatures, board status, data path errors, card resets, and other failover features. The redundancy bus 708 provides transportation of user data and redundancy links in the event of hardware failures. The TDM bus provides support for voice services on the system.

The network device supports at least four types of application cards: a switch processor I/O card (SPIO) 710, a system management card (SMC) 712, a packet service card (PSC) 714, and a packet accelerator card (not shown). Other cards used in the network device include line cards 776 and redundant crossbar cards (RCC) 718. The line cards 717, when loaded in the network device, provide input/output connectivity to the network and other devices, as well as redundancy connections. The line cards 716 include interfaces to the network through Ethernet, Fiber Optic, and the other communication mediums. The redundant crossbar card (RCC) 718 includes a non-blocking crossbar and connections to each of the cards in the network device. This allows a redundant connection to be made through the redundant crossbar card 718 from any one card to any other card in the network device. The SPIO card 710 serves as a controller of the network device and is responsible for such things as initializing the network device and loading software configurations onto other cards in the network device.

The system management card (SMC) 712 and switch processor card (not shown) are system control and management cards for managing and controlling other cards in the network device. The packet accelerator card (PAC) and packet service card (PSC) 714 provide packet processing, context processing capabilities, and forwarding capabilities among other things. The PAC and PSC 714 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for efficiency or redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 8:
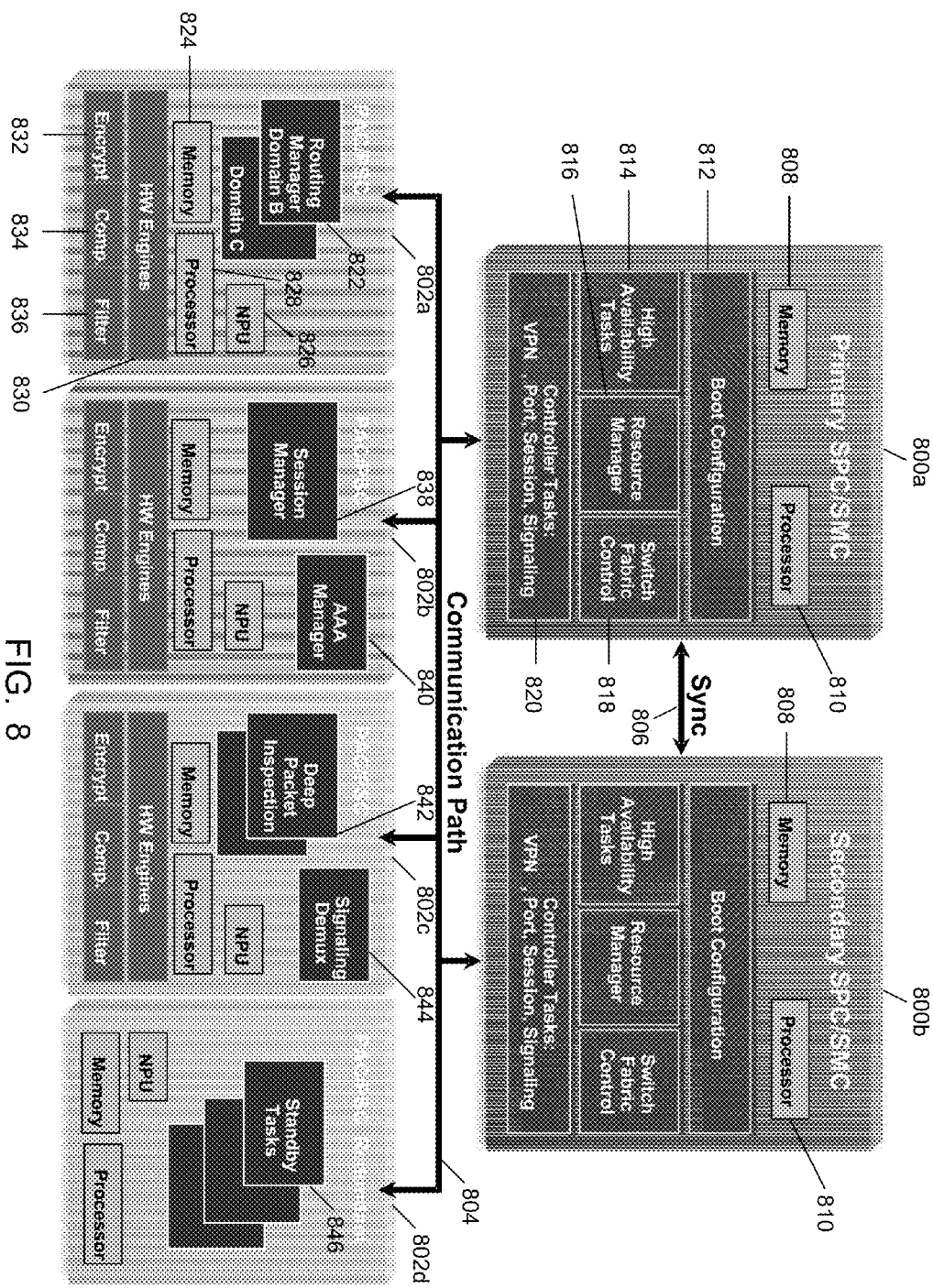

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 8 illustrates a logical view of the software architecture of a network device in accordance with certain embodiments. As shown, the software and hardware can be distributed within the network device and across different circuit boards, processors, and memory. FIG. 8 includes a primary switch processor card (SPC)/system management card (SMC) 800a, a secondary SPC/SMC 800b, PAC/PSC 802a-802d, a communication path 804, and a synchronization path 806. The SPC/SMC 800 include a memory 808, a processor 810, a boot configuration 812, high availability tasks 814, resource manager 816, switch fabric control 818, and controller tasks 820.

The SPC/SMC 800 manage and control the network device including the other cards in the network device. The SPC/SMC 800 can be configured in a primary and secondary arrangement that provides redundancy and failsafe protection. The modules or tasks running on the SPC/SMC 800 are related to network device wide control and management. The boot configuration task 812 includes information for starting up and testing the network device. The network device can also be configured to startup in different configurations and providing different implementations. These can include which functionalities and services are capable of running on the SPC/SMC 800. The high availability task 814 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 800 or a PAC/PSC 802, while some processor intensive tasks can also be performed across multiple PACs/PSCs to utilize multiple CPU resources. Distribution of these tasks is invisible to the user. The switch fabric control 818 controls the communication paths in the network device. The controller tasks module 820 can manage the tasks among the resources of the networks to provide, for example, VPN services, assign ports, and create, delete, and modify sessions for user equipment.

The PAC/PSC 802 are high-speed processing cards that are designed for packet processing and the tasks involved with providing various network functionalities on the network device. The PAC/PSC 802 include a memory 824, a network processing unit (NPU) 826, a processor 828, a hardware engine 830, an encryption component 832, a compression component 834, and a filter component 836. Hardware engines 830 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 802 is capable of supporting multiple contexts. The PAC/PSC 802 are also capable of running a variety of tasks or modules. PAC/PSC 802a provides routing managers 822 with each covering routing of a different domain. PAC/PSC 802b provides a session manager 838 and an AAA manager 840. The session manager 838 manages one or more sessions that correspond to one or more user equipment. A session allows a user equipment to communicate with the network for voice calls and data. The AAA manager 840 manages accounting, authentication, and authorization with an AAA server in the network. PAC/PSC 802 provides a deep packet inspection task 842 and a signaling demux 844. The deep packet inspection task 842 provides inspection of packet information beyond layer 4 for use and analysis by the network device. The signaling demux 844 can provide scalability of services in combination with other modules. PAC/PSC 802d provides redundancy through standby tasks 846. Standby tasks 846 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. For example, the described priority technique may be implemented in place of timers on other IP networks that use bearers or IP paths. Other embodiments are within the following claims.

We claim:

1. A method comprising:
   determining, by a management gateway, a paging priority value associated with a bearer between a mobile device and a forwarding gateway;
   the management gateway providing the paging priority value to the forwarding gateway;
   determining, by the management gateway, a paging priority threshold based on a load condition of the management gateway;
   storing, at the forwarding gateway, (i) the paging priority threshold for at least one packet delivery network with a connection to the mobile device and (ii) the paging priority value;
   comparing the paging priority value and the paging priority threshold for a given packet delivery network when a packet is received at the forwarding gateway from the given packet delivery network for the mobile device over the bearer, wherein the forwarding gateway communicates with the mobile device via the bearer; and sending a data arrival notification from the forwarding gateway to the management gateway to cause a core network to page the mobile device to receive data queued for the mobile device in the core network if the paging priority value exceeds the paging priority threshold, and delaying sending the data arrival notification until the expiration of a delay value timer if the paging priority value does not exceed the paging priority threshold, the paging priority value and the paging priority threshold thus interacting to produce a desired frequency of paging to the mobile device from the core network for the given packet delivery network, and to reduce paging based on congestion.

2. The method of claim 1, further comprising determining a delivery delay for the delay value timer based on the bearer.

3. The method of claim 1, further comprising bypassing a default delivery delay based on a comparison between the paging priority value and the paging priority threshold.

4. The method of claim 1, further comprising the management gateway setting the paging priority threshold based on an overload status of the management gateway.

5. The method of claim 1, further comprising setting a first paging priority threshold for a first user and setting a second paging priority threshold for a second user, thereby providing a priority of service to the first user that is different than a priority of service provided to the second user.

6. The method of claim 1, wherein the bearer includes one of a bearer with an IP tunnel and a bearer without an IP tunnel.

7. The method of claim 1, further comprising the management gateway sending the paging priority value using a General Packet Radio Service (GPRS) Tunneling Protocol (GTP) as an Allocation and Retention Priority (ARP) parameter.

8. The method of claim 1, wherein the bearer includes an evolved packet switch (EPS) bearer, the management gateway includes a mobile management entity (MME), the forwarding gateway includes a serving gateway (SGW), and the data arrival notification is a downlink data notification (DDN).

9. A system comprising:
a management gateway configured to:
determine a paging priority value associated with an active packet flow between a mobile device and a remote network, and
determine a paging priority threshold for a source packet delivery network with a connection to the mobile device based on a load condition of the management gateway;
a forwarding gateway in communication with the management gateway, the forwarding gateway configured to:
receive and store the paging priority value from the management gateway,
receive and store the paging priority threshold from the management gateway,
compare the paging priority value and the paging priority threshold when a packet is received at the forwarding gateway,
if the paging priority value exceeds the paging priority threshold, send a notification to the management gateway to cause a core network to page the mobile device to receive data queued for the mobile device in the core network, and
if the paging priority value does not exceed the paging priority threshold, delay the sending of the notification until the expiration of a delay value timer,
the paging priority value and the paging priority threshold thus interacting to produce a desired frequency of paging to the mobile device from the core network for the source packet delivery network, and to reduce paging based on congestion.

10. The system of claim 9, wherein the stored paging priority threshold is associated with both a specific remote network and a specific mobile device.

11. The system of claim 9, further comprising setting a first paging priority threshold for mobile devices communicating with a first remote network and setting a second paging priority threshold for mobile devices communicating with a second remote network.

12. The system of claim 9, wherein the management gateway includes a mobile management entity (MME), the active packet flow includes a bearer, the forwarding gateway includes a serving gateway (SGW), and the notification is a downlink data notification (DDN).

13. A management gateway comprising:
a memory:
a processor operable to execute instructions stored in the memory:
a first network interface for communication with a forwarding gateway;
a second network interface for communication with a mobile device;
a session module, operable to communicate with the first network interface and the second network interface and operable to determine and send a paging priority to the forwarding gateway, wherein the paging priority is associated with a packet flow between the mobile device and a remote network via the forwarding gateway; and
a priority module, operable to communicate with the first network interface and operable to send to the forwarding gateway (i) a global paging priority based on a load condition of the management gateway, and (ii) a delay value timer,
wherein the management gateway is configured to
receive, at a first time corresponding to when a packet is received at the forwarding gateway and via the first network interface, a data arrival notification from the forwarding gateway to cause a core network to page the mobile device to receive data queued for the mobile device in the core network if the paging priority exceeds the global paging priority, and
receive, at a second time and via the first network interface, the data arrival notification if the paging priority does not exceed the global paging priority, wherein the second time is based on delaying the first time by a value of the delay value timer,
the paging priority and the global paging priority thus interacting to produce a desired frequency of paging to the mobile device from the core network and to reduce paging based on congestion.

14. The management gateway of claim 13, wherein the global paging priority is based on an overload status of the management gateway.

15. The management gateway of claim 13, wherein the management gateway determines the paging priority to provide priority differentiation of service for particular remote networks.

16. The management gateway of claim 13, wherein the management gateway determines the paging priority to provide priority differentiation of service for particular mobile devices.

17. The management gateway of claim 13, wherein the management gateway includes a mobile management entity (MME), the packet flow includes a bearer, the forwarding gateway includes a serving gateway (SGW), and the notifications are downlink data notifications (DDNs).

* * * * *